United States Patent [19]

Cahill

[11] Patent Number: 5,528,070
[45] Date of Patent: Jun. 18, 1996

[54] SEMICONDUCTOR SENSOR MANUFACTURED THROUGH ANODIC-BONDING PROCESS

[75] Inventor: Sean S. Cahill, Menlo Park, Calif.

[73] Assignee: Yazaki Meter Co., Ltd., Tokyo, Japan

[21] Appl. No.: 321,829

[22] Filed: Oct. 6, 1994

Related U.S. Application Data

[62] Division of Ser. No. 141,054, Oct. 26, 1993.

[51] Int. Cl.⁶ .......................... H01L 29/82; H01L 29/06; H01L 23/58; G01L 9/00
[52] U.S. Cl. .................. 257/419; 257/417; 257/418; 257/619; 257/632; 73/724; 73/723
[58] Field of Search ........................ 257/419, 418, 257/417, 619, 632; 73/724, 723

[56] References Cited

U.S. PATENT DOCUMENTS

| | | | |
|---|---|---|---|
| 3,800,413 | 4/1974 | Frick | 29/592 |
| 3,983,022 | 8/1976 | Auyang et al. | 257/632 |
| 4,168,517 | 9/1979 | Lee | 73/724 |
| 4,196,632 | 4/1980 | Sikorra | 73/718 |
| 4,301,492 | 11/1981 | Paquin et al. | 361/283 |
| 4,425,799 | 1/1984 | Park | 73/718 |
| 4,458,537 | 7/1984 | Bell et al. | 73/718 |
| 4,467,394 | 8/1984 | Grantham et al. | 361/283 |
| 4,606,228 | 8/1986 | Whitmore | 73/718 |
| 4,609,966 | 9/1986 | Kuisma | 73/724 |
| 4,612,812 | 9/1986 | Broden | 73/718 |
| 4,754,365 | 6/1988 | Kazahaya | 361/283 |
| 4,773,972 | 9/1988 | Mikkor | 73/724 |
| 4,790,192 | 12/1988 | Knecht et al. | 73/721 |
| 4,829,826 | 5/1989 | Valentin et al. | 73/718 |
| 4,872,945 | 10/1989 | Myers et al. | 156/627 |
| 4,905,575 | 3/1990 | Knecht et al. | 92/103 SD |
| 4,996,627 | 2/1991 | Zias et al. | 361/283 |
| 5,056,369 | 10/1991 | Tamai et al. | 73/718 |
| 5,114,664 | 5/1992 | Terhune | 376/245 |
| 5,161,532 | 11/1992 | Joseph | 128/635 |
| 5,169,599 | 12/1992 | Joseph et al. | 422/57 |
| 5,177,579 | 1/1993 | Jerman | 257/419 |
| 5,178,015 | 1/1993 | Loeppert et al. | 73/718 |
| 5,209,118 | 5/1993 | Jerman | 73/724 |
| 5,211,058 | 5/1993 | Fukiura et al. | 73/724 |
| 5,216,273 | 6/1993 | Doering et al. | 257/419 |
| 5,264,075 | 11/1993 | Zanini-Fisher et al. | 156/633 |
| 5,277,068 | 1/1994 | Fukiura et al. | 73/724 |
| 5,320,705 | 6/1994 | Fujii et al. | 156/630 |
| 5,323,656 | 6/1994 | Fung et al. | 73/718 |

*Primary Examiner*—Jerome Jackson
*Assistant Examiner*—Jhihan Clark
*Attorney, Agent, or Firm*—Sughrue, Mion, Zinn, Macpeak & Seas

[57] ABSTRACT

A semiconductor sensor comprising a semiconductor substrate and a glass substrate. The semiconductor substrate includes a support member having an opening centrally defined therein, a diaphragm positioned in the opening of the support member, and a flexible supporting means for supporting and coupling the diaphragm and the support member. The glass substrate includes a portion facing the diaphragm and the supporting means and at least one recess defined in this portion which faces the entirety of the supporting means. The glass substrate also includes a metal layer deposited on a surface of the glass substrate and a dielectric layer deposited on the metal layer such that the dielectric layer faces the diaphragm.

5 Claims, 2 Drawing Sheets

SEMICONDUCTOR SENSOR MANUFACTURED THROUGH ANODIC-BONDING PROCESS

This is a divisional of application No. 08/141,054 filed Oct. 26, 1993.

BACKGROUND OF THE INVENTION

1. Field of the Invention

This invention relates to a semiconductor sensor consisting of a silicon wafer and a glass substrate and a method for manufacturing the same, whereby, when a silicon wafer having a diaphragm is bonded with a glass substrate through anodic bonding process, the glass substrate contains a dielectric material and a recess or a cavity so as to prevent a bond from occurring between the glass substrate and the silicon wafer.

2. Related Art

In FIG. 6, anodic-bonding process proceeds with the following steps. A silicon wafer 201 having a smooth surface 201a and a diaphragm 201b is bonded to a glass substrate 202 (for example, pyrex glass). After that, a unit containing the silicon wafer 201 and the glass substrate 202 is heated in the range of 300° C. –400° C. by a hot plate 204. Under this condition, when a negative voltage within 500–1000 V is applied to the glass substrate 202 by a negative electrode 203, a large electrostatic attracting force is generated between the silicon wafer 201 and the glass substrate 202 so that the chemical bonding occurs between the silicon wafer 201 and the glass substrate 202 at a boundary surface. However, in this voltage applying step, the diaphragm 201b serving as an undesired bonding portion at the time of performing the anodic bonding process is bonded to the glass substrate 202, because the large electrostatic attracting force is generated between the silicon wafer 201 and the glass substrate 202.

In view of this problem, for example, in Unexamined Japanese Utility Model Application No. sho. 3-88137, an oxide layer is formed on both sides of the diaphragm so as to prevent a bond from occurring between the diaphragm 201b and the glass substrate 202. However, if this structure is employed, it is difficult to ensure the sufficient sensitive characteristic.

SUMMARY OF THE INVENTION

In view of the forgoing problem, one object of the present invention is to provide a method for anodic-bonding of a silicon wafer to a glass substrate without bonding at an undesired portion defined therebetween.

Another object of the present invention is to provide a semiconductor sensor with a dielectric layer and a cavity without a bond occurs therebetween when anodic-bonding is applied.

According to one aspect of the preset invention, there is provided a semiconductor sensor comprising a semiconductor substrate including: a support member having a opening centrally defined therein; a diaphragm positioned in the opening of the support member; supporting means for supporting and coupling the diaphragms with the support member; a glass substrate having a cavity defined thereon in such a manner that the cavity is confronted to the supporting means, the glass substrate including: a metal layer deposited on a surface of the glass substrate; a dielectric layer deposited on the metal layer, the glass substrate being confronted to the diaphragms.

According to another aspect of the present invention, there is provided a method for bonding a silicon substrate and a glass substrate through anodic-bonding process, the method comprising the steps of: forming at least two holes onto the glass substrate; forming a recess on the glass substrate, the recess being confronted to an undesired bonding portion defined in the silicon substrate; depositing a metal layer onto the glass substrate with the predetermined pattern; depositing a dielectric layer onto the metal layer, the insulating layer covering substantially the whole surface of the metal layer; and bonding the glass substrate and the semiconductor material through a predetermined condition.

According to the present invention, the silicon substrate is bonded to the glass substrate through the anodic-bonding process without bonding the diaphragm or the corrugation such as undesired bonding portion onto the glass substrate.

According to the present invention, the silicon substrate contains the corrugation so that the displacement of the diaphragm with respect to the pressure is increased so as to obtain a increased travel distance per unit of applied force.

DETAILED DESCRIPTION OF THE PREFERRED EMBODIMENT

A preferred embodiment of the present invention will now be described with reference with the drawings.

Figure 5:
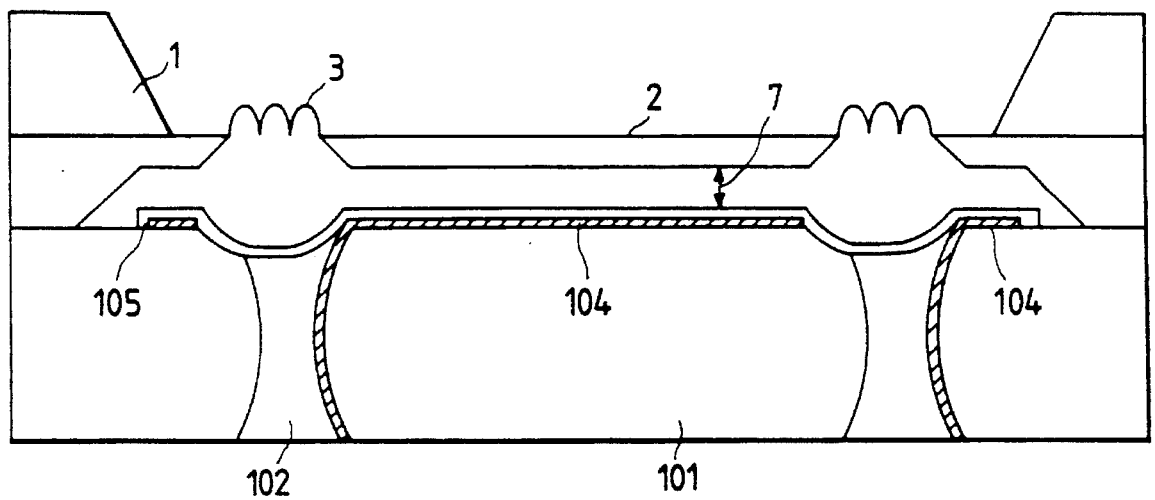
FIG. 5 is a sectional view of a semiconductor sensor of an example of the present invention.
Figure 6:
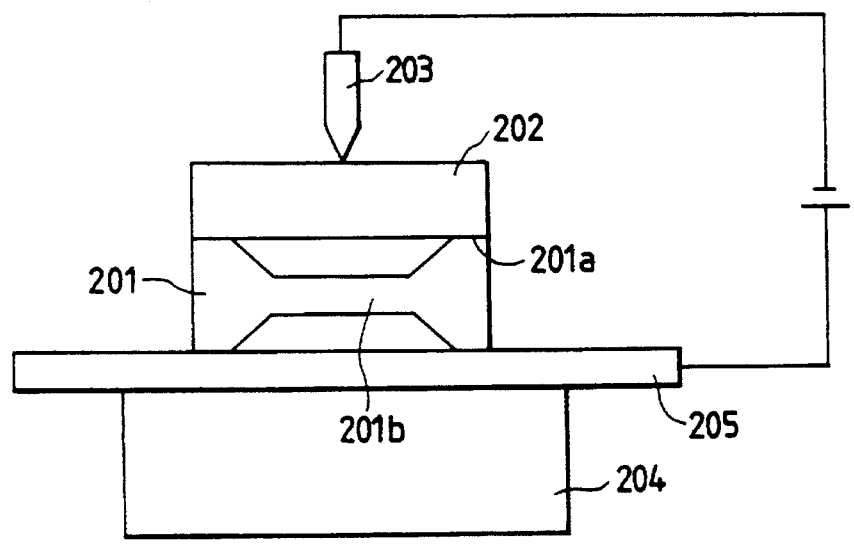
FIG. 6 is showing a diagram of the prior art anodic bonding process.

One example of a semiconductor sensor of the present invention is shown in FIG. 5. A silicon substrate 1 on which a diaphragm 2 is formed is bonded to the substrate 101 through the anodic-bonding process. A corrugation 3 and the diaphragm 2 serving as undesired bonding portions when anodic-bonding is performed are formed on the silicon substrate 1 by the micro machining process.

The glass substrate 101 manufacturing process shown in FIGS. 1–4 is described hereinbelow.

Figure 1:
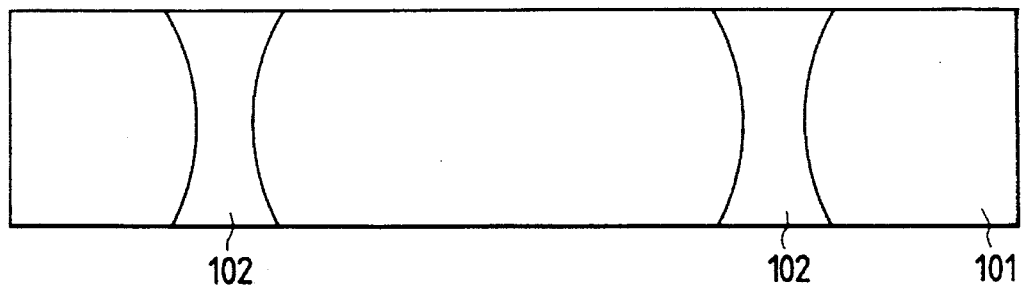
FIGS. 1–4 are sectional views of a process used in anodic bonding of the present invention.
Figure 2:
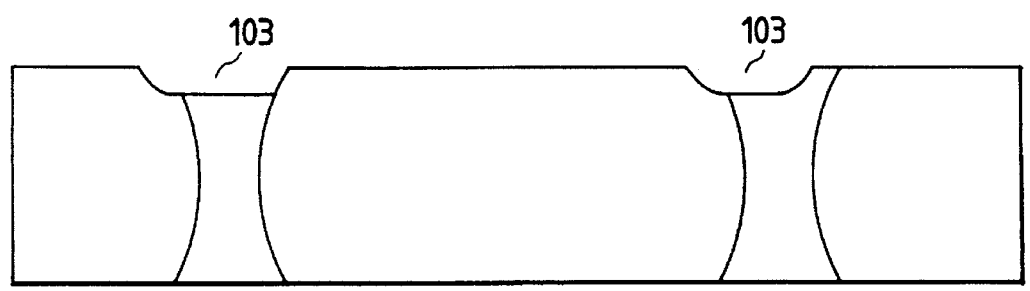

In FIG. 1, two holes are precisely machined onto a glass substrate 101 (having a thickness of approximately 400–500 µm). In FIG. 2, the glass substrate 101 is patterned on a top surface which is confronted to the silicon substrate 1 with a mask for forming a recess 103 such that the recess 103 faces the corrugation 3 formed on the substrate 1. This recess 103 prevents the undesired bonding of the corrugation 3 to the glass substrate 101.

Figure 3:
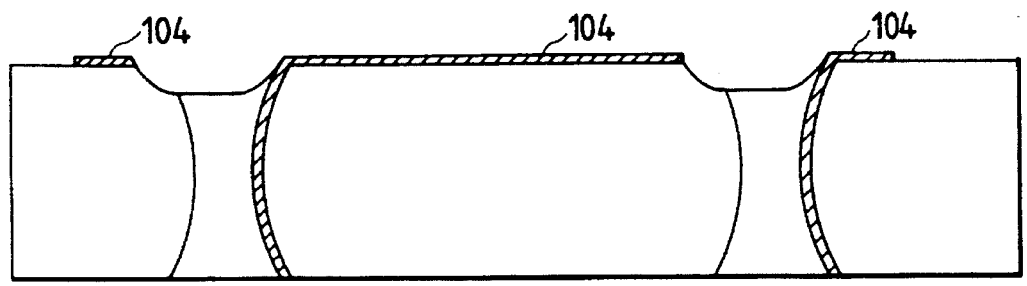

Next, in FIG. 3, a metal, for example aluminum, is evaporated on a top surface of the glass substrate 101 to form a metal layer 104. At this time, a bottom surface and inner portions of the holes 102 are evaporated so as to electrically bond the metal layers formed on the top surface and inner portion of the holes to the glass substrate 101 to the glass substrate.

Figure 4:
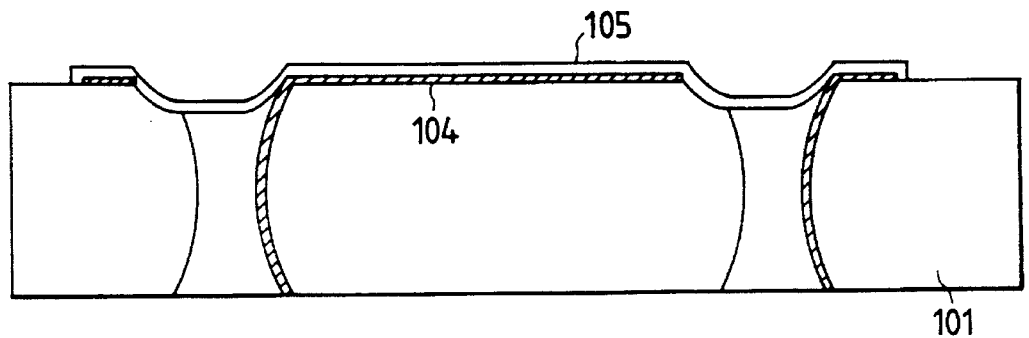

Thereafter, in FIG. 4, a dielectric material 105, for example alumina, is formed or deposited on all surfaces of the metal layer 104 which face the silicon substrate 1.

Thus, when the silicon substrate 1 is bonded to the glass substrate 101 through the anodic-bonding process, the diaphragm 2 and corrugation 3 is not bonded to the glass substrate 101.

As described above, according to the present invention, when the silicon substrate is bonded to the glass substrate through the anodic-bonding process, undesired bonding portions such as the corrugation and diaphragm are not bonded to the glass substrate.

Of course, the concept of the present invention is not limitted by this embodiment. For instance, it is possible to form the dielectric layer on surface of the diaphragm, which is confronted to the glass substrate.

Moreover, according to the present invention, the silicon substrate. contains the corrugation so that the displacement of the diaphragm with respect to the pressure is increased so as to obtain a increased travel distance per unit of applied force.

What is claimed is:

1. A semiconductor sensor comprising:

a semiconductor substrate including:

a support member having an opening centrally defined therein;

a diaphragm positioned in the opening of the support member;

a flexible supporting means for supporting and coupling the diaphragm with the support member, wherein said flexible supporting means is more flexible than said diaphragm;

a glass substrate having a portion facing said diaphragm and said flexible supporting means and at least one recess defined in said portion in such a manner that said at least one recess faces the entirety of said flexible supporting means, the glass substrate having a through hole and including:

a metal layer deposited on a surface of the glass substrate;

a dielectric layer deposited on the metal layer, the dielectric layer facing the diaphragm, wherein said recess and said dielectric layer prevent said diaphragm and said flexible supporting means from bonding to said glass substrate during an anodic-bonding process.

2. A semiconductor sensor as claimed in claim 1, wherein the flexible supporting means includes a corrugation member.

3. A semiconductor sensor as claimed in claim 1, wherein said recess is annular.

4. A semiconductor sensor as claimed in claim 1, further comprising a plurality of holes formed in the glass substrate, wherein said metal layer is further deposited on inner surfaces of the holes.

5. A semiconductor sensor as claimed in claim 2, wherein said corrugation member is annular.

* * * * *